(12) United States Patent  
Evans et al.

(10) Patent No.: US 12,098,316 B2  
(45) Date of Patent: *Sep. 24, 2024

(54) COMPOSITIONS FOR ENHANCING SOIL NUTRIENTS

(71) Applicants: Bryan D. Evans, Olathe, KS (US); Adam Evans, Lenexa, KS (US)

(72) Inventors: Bryan D. Evans, Olathe, KS (US); Adam Evans, Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,387

(22) Filed: Sep. 19, 2022

(65) Prior Publication Data

US 2023/0043469 A1 Feb. 9, 2023

Related U.S. Application Data

(63) Continuation-in-part of application No. 16/599,487, filed on Oct. 11, 2019, now Pat. No. 11,447,698.

(60) Provisional application No. 62/745,659, filed on Oct. 15, 2018.

(51) Int. Cl.  
*C09K 17/24* (2006.01)

(52) U.S. Cl.  
CPC .................... *C09K 17/24* (2013.01)

(58) Field of Classification Search  
None  
See application file for complete search history.

(56) References Cited

U.S. PATENT DOCUMENTS

| | | | |
|---|---|---|---|
| 5,456,775 A | * | 10/1995 | Schapira ............... B01J 2/28 149/46 |
| 2008/0173053 A1 | | 7/2008 | Sanders et al. |
| 2010/0116009 A1 | | 5/2010 | Evans |
| 2020/0115632 A1 | | 4/2020 | Evans et al. |
| 2021/0315203 A1 | | 10/2021 | Coulter et al. |

FOREIGN PATENT DOCUMENTS

| | | |
|---|---|---|
| FR | 2701942 A1 | 9/1994 |
| SU | 1085966 A1 | 4/1984 |
| WO | 2006131213 A1 | 12/2006 |
| WO | 2015001366 A2 | 1/2015 |
| WO | 2015017329 A2 | 2/2015 |

OTHER PUBLICATIONS

International Search Report and Written Opinion, dated Feb. 14, 2020, 11 pages, issued in PCT Application No. PCT/US2019/055804.  
Search Report with translation, dated Oct. 26, 2021, 4 pages, issued in Russian Application No. 2021113666.

* cited by examiner

*Primary Examiner* — Charles R Nold  
(74) *Attorney, Agent, or Firm* — AVEK IP, LLC (57) ABSTRACT

Interpolymers useful for enhancing the efficacy of nutrients in soil and fertilizers; and methods of inhibiting the precipitation of, and/or dispersing, inorganic elements.

17 Claims, 5 Drawing Sheets

6-24-6 + interpolymer @ 0.5%    6-24-6 + Avail @ 0.5%    6-24-6 (check)

COMPOSITIONS FOR ENHANCING SOIL NUTRIENTS

CROSS-REFERENCE TO RELATED APPLICATIONS

This application is a continuation-in-part of U.S. patent application Ser. No. 16/599,487, filed Oct. 11, 2019, titled "Fertilizer", which is pending and claims priority to U.S. Provisional Patent Application No. 62/745,659, filed Oct. 15, 2018, the entire disclosure of each of which is incorporated by reference herein.

FIELD OF THE INVENTION

The invention relates to compositions for enhancing soil nutrients. More specifically, the invention is directed to compositions and methods of using said compositions to treat soil, either alone or with a fertilizer, to enhance efficacy of soil nutrients or nutrients in the fertilizer.

BACKGROUND

Fertilizers are ubiquitous throughout the agricultural industry to promote plant growth such that higher yields may be achieved. Generally, fertilizers provide nitrogen (N), phosphorus (P), and/or potassium (K), along with other nutrients, to the plant, whether it be in solid (e.g., granule or powder) or liquid form. Plants are often unable to fully utilize the nutrients in fertilizer because reactions between the elements decrease the amount of available nutrients for the plant to uptake. For example, inorganic phosphorus reacts with iron, aluminum, manganese, magnesium, or calcium to form phosphate minerals, which decreases the amount of available elemental phosphorus which can be used by the plant.

Typically, less than 50% of fertilizers are absorbed by plants. In the case of phosphate, as little as 15% of the fertilizer may be absorbed. A fertilizer having the ability to prevent or inhibit the precipitation of inorganic phosphate, carbonate, or sulfate salts, or the ability to disperse inorganic particulates, is desirable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

Provided herein are compounds useful for enhancing the efficacy of fertilizer nutrients in agricultural applications in need thereof.

In one aspect, provided herein are compounds having one or more moieties with Formula (A):

(A)

wherein: Y is H, $CH_3$, or $CH_2$—COOX; and Z is $PO_3H_2$ or COOX.

In another aspect, provided herein are compounds having one or more moieties having Formula B:

(B)

In still another aspect, provided herein are compounds having one or more moieties with Formula C:

(C)

In still yet another aspect, a compound of the invention has one or more moieties with Formula D:

(D)

In a further aspect, a compound of the invention is a compound having one or more moieties having Formula E:

(E)

In another aspect, a compound of the invention is a compound having one or more moieties with Formula F:

(F)

In still another aspect, a compound of the invention is a compound with moieties having Formula G:

(G)

In yet another aspect, a compound of the invention is a compound with one or more moieties of Formula H1 or H2:

(H1)

(H2)

wherein W is $CH_3$ or $N(R15)(R16)$.

According to still yet another aspect, a compound of the invention is a compound having one or more moieties of Formula I1 or I2:

(I1)

(I2)

In another aspect, the compound of the invention is an interpolymer having one or more moieties of Formula J:

(J)

In one embodiment, a fertilizer product has an effective amount of one or more of a compound having one or more moieties of Formula A-J, and nitrogen, phosphorous, potassium, calcium, magnesium, sulfur, silicon, boron, zinc, manganese, copper, iron, molybdenum, nickel, cobalt, vanadium materials, and mixtures thereof.

According to another embodiment, a method of stabilizing a fertilizer product includes adding to a fertilizer product an effective amount of one or more of the compounds having one or more of the moieties of Formula A-J to inhibit precipitation of inorganic phosphate, carbonate, or sulfate salts in an aqueous system and/or disperse inorganic particulates including calcium, magnesium, iron, copper, zinc, manganese, and salts thereof.

DETAILED DESCRIPTION

Over the past 20+ years, laboratory and field studies have shown that high charge density polymers, such as the polymer compounds described herein, can influence fertilizer phosphorus (P) reaction products with soil components, reduce P fixation, enhance P availability and uptake, and increase crop yields. As is described in greater detail herein, the basis of the polymer effect is reaction with (sequestration of) P-fixing metals in a microenvironment around the P granule or in the liquid droplet. Improved P fertilizer use efficiency can logically allow reduction of application rate, but the amount of reduction varies with location and many other production factors. Rather than trying to improve profitability by cost cutting, a better route may be to allow the better P availability resulting from the polymer chemistry to increase yields and profitability.

University studies over the past 50+ years have shown that there is a strong interaction between soil P availability and plant uptake of the micronutrient zinc (Zn). High concentrations of available P at the root surface can hinder Zn uptake and increase pressure on soil Zn supplies. If supplemental Zn is not added when Zn soil tests are low or when environmental conditions limit uptake, a P-induced Zn shortage (P—Zn interaction) may become more pronounced with limiting effects on yield potential. The solution to this situation is to provide readily available Zn as part of the fertilizer program, usually in the liquid starter fertilizer. Zinc can also be coated on other fertilizer materials such as urea or granular P. However, work conducted by universities and the National Fertilizer Development Center of the Tennessee Valley Authority showed that some Zn compounds can react with the surface of granular P fertilizer materials resulting in low Zn availability. Polymer coating of the P granules prior to Zn coating may reduce this possibility.

A high charge density polymer, such as the polymers described herein, in the fertilizer mixture may enhance the movement of nutrient cations (positively charged ions such as zinc, ammonium, potassium and others) across root cell membranes and help overcome the limitations of P—Zn interactions. Accordingly, provided herein are precipitation inhibiting or dispersing interpolymers useful as an ingredient of a fertilizer provided for agricultural applications for the purpose of increasing the efficacy of fertilizer nutrients. In a non-limiting aspect, these compounds may stabilize the fertilizer by inhibiting the precipitation of, for example, inorganic phosphate, carbonate, or sulfate salts in an aqueous system, and/or by dispersing inorganic particulates such as calcium, magnesium, iron, copper, zinc, manganese, and salts thereof, for example.

Fertilizers typically include nitrogen for the promotion of leaf growth, phosphorus to aid in the development of roots, flowers, seeds, and fruit (if any), and potassium to promote strong growth of the plant stem, and to enhance the movement of water through a plant. Additional macronutrients found in fertilizers may include calcium, magnesium, and sulfur. Micronutrients which may also be present include copper, iron, manganese, molybdenum, zinc, boron, silicon, cobalt, and vanadium. Not all fertilizers will include all macronutrients and micronutrients, and the proportions of such nutrients may vary substantially.

While the macronutrients and the micronutrients found in fertilizers are essential for optimal plant growth, the nutrients may be susceptible to precipitation and/or clumping. When this occurs, the plant cannot take advantages of the nutrients in the fertilizer. Accordingly, additional fertilizer must then be used on the plant, which increases expenses both in the cost of the additional fertilizer, and the time it takes to apply the fertilizer to the plants. The invention is directed to a method of enhancing the ability of a fertilizer to aid in the optimization of plant growth by mixing an effective amount of a precipitation inhibiting or dispersing interpolymer with the fertilizer.

In one aspect, the compounds of the invention are useful for stabilizing fertilizer nutrients to inhibit the precipitation of inorganic compounds such as phosphate, carbonate or sulfate salts in an aqueous system. In another aspect, the compounds of the invention are useful for dispersing inorganic particulates such as calcium, magnesium, iron, copper, zinc, manganese, and salts thereof. According to one embodiment, the compounds of the invention are useful as both a stabilizer and an inhibitor.

The disclosed composition may be pre-mixed with a fertilizer before being applied to the plant.

Definitions

Listed below are definitions of various terms used to describe the invention. The definitions apply to the terms are used throughout this specification and claims, unless otherwise limited in specific instances, either individually or as part of a larger group.

Unless defined otherwise, all technical and scientific terms used herein generally have the same meaning as commonly understood by one of ordinary skill in the art to which this invention belongs. Generally, the nomenclature used herein and the laboratory procedures are those well-known and commonly employed in the art.

As used herein, the articles "a" and "an" refer to one or to more than one (i.e. to at least one) of the grammatical object of the article. By way of example, "an element" means one element or more than one element. Furthermore, use of the term "including" as well as other forms, such as "include", "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±0-20% from the specified value, as such variations are appropriate to perform the disclosed methods.

As used herein, the term "effective amount" refers to a sufficient amount of an agent to provide the desired result. That result may be reduction and/or alleviation of the signs of precipitation or aggregation of inorganic nutrient elements, or any other desired alteration of a biological system. An appropriate amount in any individual case may be determined by one of ordinary skill in the art using routine experimentation.

As used herein, the term "alkyl," by itself or as part of another substituent means, unless otherwise stated, a straight or branched chain hydrocarbon having the number of carbon atoms designated (i.e., $C_{1-6}$ means one to six carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl.

An "aryl" is a radical derived from a hydrocarbon ring system comprising hydrogen, 6 to 30 carbon atoms and at least one aromatic ring. The aryl radical may be a monocyclic, bicyclic, tricyclic or tetracyclic ring system, which may include fused or bridged ring systems. Aryl radicals include, but are not limited to, aryl radicals derived from the hydrocarbon ring systems of aceanthrylene, acenaphthylene, acephenanthrylene, anthracene, azulene, benzene, chrysene, fluoranthene, fluorene, as-indacene, sindacene, indane, indene, naphthalene, phenalene, phenanthrene, pleiadene, pyrene, and triphenylene. Unless stated otherwise specifically in the specification, the term "aryl" or the prefix "ar" (such as in "aralkyl") is meant to include aryl radicals that are optionally substituted.

As used herein, the term "aralkyl" refers to any univalent radical derived from an alkyl radical by replacing one or more hydrogen atoms with an aryl group.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$—CH$_2$—OH, —CH$_2$—CH$_2$—NH—CH$_3$, and —CH$_2$—S—CH$_2$—CH$_3$. Up to two heteroatoms may be consecutive, such as, for example, —CH$_2$—NH—OCH$_3$, or —CH$_2$—CH$_2$—S—S—CH$_3$. Preferred heteroalkyl groups have 1-10 carbons.

The term "cycloalkyl" refers to a monovalent non-aromatic, saturated, or partially unsaturated ring having 3 to 12 carbon atoms (C$_3$-C$_{12}$) as a monocyclic ring or 7 to 12 carbon atoms as a bicyclic ring. Examples of monocyclic carbocycles or cycloalkyls include, but are not limited to, cyclopropyl, cyclobutyl, cyclopentyl, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, cyclohexadienyl, cycloheptyl, cyclooctyl, cyclononyl, cyclodecyl, cycloundecyl, cyclododecyl, and adamantanyl.

As used herein, the term "hydroxyalkyl" or "hydroalkyl" means an alkyl group as defined above wherein at least one of the hydrogen atoms of the alkyl group is replaced by a hydroxy group. Examples of hydroxyalkyl include, but are not limited to, methyl, ethyl, propyl, isopropyl, isobutyl, sec-butyl, tert-butyl, pentyl or n-hexyl wherein one or more hydrogen atoms are replaced by OH, as well as those hydroxyalkyl groups specifically illustrated by the examples herein below. The term "Ci-Ci2-hydroxyalkyl" means a hydroxyalkyl group having 1 to 12 carbon atoms, wherein hydroxyalkyl is as defined herein.

As used herein, the term "aryl," employed alone or in combination with other terms, means, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl. In some embodiments, aryl groups have six carbon atoms. In some embodiments, aryl groups have from six to ten carbon atoms. In some embodiments, aryl groups have from six to sixteen carbon atoms.

Compounds of the Invention

The invention relates to the discovery of compounds that are useful, when mixed with a fertilizer, to prevent precipitation or aggregation of nutrients in fertilizers to enhance the efficacy of the fertilizer nutrients. In one aspect, the method includes adding an effective amount of a precipitation inhibiting interpolymer to a fertilizer. In another aspect, the method includes adding an effective amount of a dispersing interpolymer to a fertilizer. According to one embodiment, an interopolymer mixed with a fertilizer is useful when mixed with a fertilizer to both inhibit precipitation of inorganic elements and aggregation of inorganic particulates in said fertilizer.

The compounds useful within the invention can be synthesized using techniques well-known in the art. The starting materials and intermediates required for the synthesis may be obtained from commercial sources or synthesized according to methods known to those skilled in the art.

In one aspect, the compound of the invention is an interpolymer having a moiety of structure A:

(A)

wherein
Y is H, CH$_3$, or CH$_2$—COOX;
Z is PO$_3$H$_2$ or COOX;
X is H, a metal cation, or N—(R1)$_4$; and
wherein R1 is H, a C$_1$-C$_4$ alkyl group, or a C$_1$ to C$_4$ hydroxyalkyl group, or mixtures thereof. In embodiments, X and Y are not both H. In one embodiment, Y is H, CH$_3$, or CH$_2$—COOX; Z is PO$_3$H$_2$ or COOX, and X is a metal cation or N—(R1)$_4$. In another embodiment, Y is CH$_3$ or CH2—COOX, Z is PO$_3$H$_2$ or COOX, and X is H.

In another aspect, the compound of the invention is an interpolymer having a moiety of structure B:

(B)

wherein:
R2 is H or CH$_3$;
R3 is H, or a C$_1$-C$_4$ alkyl group;
R4 is a C$_1$-C$_8$ alkyl group, a phenyl group, or a C$_8$-C$_{10}$ aralkyl group; and
X is H, a metal cation, or N—(R1)$_4$; and
wherein R1 is H, a C$_1$-C$_4$ alkyl group, a C$_1$ to C$_4$ hydroxyalkyl group, or mixtures thereof.

In still another aspect, the compound of the invention is an interpolymer having a moiety of structure C:

(C)

wherein
R5 is H or CH$_3$;
R6 is a C$_1$-C$_8$ alkyl group, a phenyl group, or a C$_8$-C$_{10}$ aralkyl group; and
X is H, a metal cation, or N—(R1)$_4$; and
wherein R1 is H, a C$_1$-C$_4$ alkyl group, a C$_1$ to C$_4$ hydroxyalkyl group, or mixtures thereof.

In yet another aspect, the compound of the invention is an interpolymer having a moiety of structure D:

(D)

wherein
R7 is H or CH$_3$,
R8 is a C$_1$-C$_4$ hydroxyalkyl group, or a C$_8$-C$_{10}$ aralkyl group; and
X is H, a metal cation, or N—(R1)$_4$; and
wherein R1 is H, a C$_1$-C$_4$ alkyl group, a C$_1$-C$_4$ hydroxyalkyl group, or mixtures thereof.

In still yet another aspect, the compound of the invention is an interpolymer having a moiety of structure E:

(E)

wherein:
R9 is H or CH3;
R10 is a phenyl group, a C$_1$-C$_6$ alkyl group, or a C$_6$-C$_8$ cycloalkyl group; and
X is H, a metal cation, or N—(R1)$_4$; and
wherein R1 is H, a C$_1$-C$_4$ alkyl group, a C$_1$-C$_4$ hydroxyalkyl group, or mixtures thereof.

In a further aspect, the compound of the invention is an interpolymer having a moiety of structure F:

(F)

wherein:
R11 is H or CH$_3$; and
X is H, a metal cation, or N—(R1)$_4$; and
wherein R1 is H, a C$_1$-C$_4$ alkyl group, a C$_1$-C$_4$ hydroxyalkyl group, or mixtures thereof.

In another aspect, the compound of the invention is an interpolymer having a moiety of structure G:

(G)

wherein:
R12 is H or CH$_3$; and
R13 is a C$_1$-C$_4$ hydroxyalkyl group.

In still another aspect, the compound of the invention is an interpolymer having a moiety of structure H1 or H2:

(H1)

(H2)

wherein, in H1:
R14 is H or CH$_3$; and
W is CH$_3$, or N(R15)(R16);
wherein:
R15 and R16 are independently each H, a C$_1$-C$_8$ alkyl, a C$_6$-C$_8$ cycloalkyl group, or a benzyl group, or structure (H2); and
R15 and R16 are not both H; and wherein, in H2:
R17 is H or CH$_3$; and
R18 is H or a C$_1$-C$_6$ alkyl group; and
n is 1-3.

In yet another aspect, the compound of the invention is an interpolymer having a moiety of structure I1 or I2:

(I1)

(I2)

wherein, in I1:
R19 is H or CH$_3$, and
R20 is CH$_3$, a C$_1$-C$_6$ alkyl group, a C$_6$-C$_{10}$ aryl group, or a C$_6$-C$_{10}$ aralkyl group, or structure (I2).
In I2:
R21 is H or CH$_3$; and
R22 is H or a C$_1$-C$_6$ alkyl group; and
n is 1-3.

In another aspect, the compound of the invention is an interpolymer having a moiety of structure J:

(J)

wherein R23 is a $C_3$-$C_5$ alkyl group.

According to an embodiment of the invention, an interpolymer has one or more moieties selected from structures A-J, and is added to a fertilizer. The fertilizer has effective amounts of one or more of micronutrients, including but not limited to: nitrogen, phosphorous, potassium, calcium, magnesium, sulfur, silicon, boron, zinc, manganese, copper, iron, molybdenum, nickel, cobalt, vanadium, and mixtures thereof. The micronutrients may further include oxides, sulfates, chlorides, and chelates thereof.

In one embodiment, between about 10 and 90 weight percent of the interpolymer comprises polymer units derived from structure A. In some embodiments, the polymer units derived from structure A comprise between 20 and 80 weight percent of the interpolymer. In further embodiments, the polymer units derived from structure A comprises between 30 and 80 weight percent. In an embodiment, the polymer units derived from structure A comprise between about 40 and 80 weight percent of the interpolymer.

In another embodiment, between about 10 and 60 weight percent of the interpolymer comprises polymer units derived from structures B, C, D, E, and F. In some embodiments, between about 10 and 50 weight percent of the interpolymer comprises polymer units derived from structures B, C, D, E, and F. In an embodiment, the polymer units derived from structures B, C, D, E, and F comprise about 30 weight percent of the interpolymer.

In still another embodiment, between about 0 and 50 weight percent of the interpolymer comprises polymer units derived from structures G, H, I and J. In some embodiments, between about 0 and 40 weight percent of the interpolymer comprises polymer units derived from structures G, H1 and/or H2, and I1 and/or I2, and J. In an embodiment, the polymer units derived therefrom comprise about 10-40, or about 20-30 weight percent of the interpolymer. In still a further embodiment, about 25 weight percent of the interpolymer is derived from structures G, H, I, and J.

In a further embodiment, the interpolymer is configured to stabilize the fertilizer by inhibiting the precipitation of inorganic phosphate, carbonate, and/or sulfate salts in an aqueous system. In still another embodiment, the interpolymer may be configured to disperse inorganic particulates such as calcium, magnesium, iron, copper, zinc, manganese, and salts thereof. In some embodiments, the interpolymer may be configured to both inhibit precipitation of certain elements and disperse certain particulates.

According to another aspect of the invention, the interpolymer may be added to manure for the purpose of enhancing the efficacy of organic fertilizer. Typically, with organic fertilizers, negatively charged phosphate binds with positively charged calcium, magnesium, aluminum, and/or iron. Once this occurs, the phosphate is no longer available to plants for use as a nutrient. Notably, this process can also occur in the soil. As a result, losses of phosphorus of greater than 50% in the fertilizer can occur before it is even applied to the soil. Likewise, nitrogen losses due to leaching, volatilization, and denitrification can exceed 50%. In addition, for organic fertilizers, ammonia emissions are becoming increasingly concerning. As is discussed in greater detail below, an interpolymer of the invention described herein may be added to the fertilizer to reduce ammonia emission in the fertilizer, and to improve the availability of the nutrients in the fertilizer for use by plants.

Typically, ammonium bicarbonate in manure converts to ammonia and is subsequently lost as a gas. The interpolymer of the invention may be mixed together with the organic fertilizer (e.g., manure) to assist the formation of ammonium and bicarbonate ions. Due in part to the low pH of the interpolymer, the formation of ammonia is depressed, and the bicarbonate is further broken down into carbon dioxide and water. Eventually, carbon dioxide is released as an off gas, rather than ammonia. The water dilutes the solid organic matter, and the carbon dioxide further loosens the structure of the manure. Eventually, liquefaction of the manure body may occur.

The interpolymer disperses through the bicarbonates and moves through the fertilizer. In embodiments, the interpolymer may be applied to the organic fertilizer before crusting to inhibit or limit the amount of crusting. The negative charges of the interpolymer attract and stabilize ammonium cations so that the conversion from ammonium ions to ammonia gas slows down and results in reduced ammonia evaporation (emission).

Phosphate salts form in the organic fertilizer as a result of exceeding its solubility limit, which is greatly reduced by pH. In general, the most favorable pH to form calcium phosphate is about pH 8, the most favorable pH to form aluminum phosphate is about pH 5.5, and the most favorable pH to form iron phosphate is about pH 3.5. In this form, the phosphorous is not available to plants as a nutrient. When the interpolymer of the invention is added to the fertilizer, it prevents the formation of phosphate salts which would be precipitated out of soil solution otherwise, thereby increasing the phosphorous available to the plant as a nutrient.

In an embodiment, the interpolymer has a pH of approximately 0-7, more preferably between about 2 and 5, and most preferably about 3. The specific gravity is between about 0.5 and 2.0, and more preferably between about 1 and 1.5, and most preferably between about 1.0 and 1.2. In an embodiment, the specific gravity is about 1.10, 1.11, 1.12, 1.13, 1.14, 1.15, 1.16, 1.17, 1.18, 1.19, or 1.20. The molecular size of the interpolymer is between 3,000 daltons and 50,000 daltons, more preferably between about 3,500 daltons and 40,000 daltons, and most preferably between about 4,000 and 35,000 daltons. In an embodiment, the molecular size is about 30,000 daltons. In embodiments, the interpolymer has a total solid content of about 20 to 60%, more preferably between 40% and 50%. In one embodiment, the total solid content is approximately 44%.

According to one embodiment, in the case of dairy manure, the interpolymer is added to the organic fertilizer at a rate of approximately 0.25 gallons per approximately 14,000 gallons of manure. According to another embodiment, in the case of hog manure, the interpolymer is added to the organic fertilizer at a rate of approximately 0.25 gallons per approximately 7,000 gallons of manure.

In some embodiments, the interpolymer is mixed with an organic acid. The organic acid may be selected from the list consisting of citric acid, humic acid, lactic acid, acetic acid, formic acid, oxalic acid, malic acid, uric acid, tartaric acid, ascorbic acid, combinations thereof, and/or other similar organic acids. As described in U.S. Pat. No. 10,781,145, which is incorporated herein by reference in its entirety, when applied with a phosphate-based fertilizer, the organic acid may help with the solubility of the fertilizer, allowing the phosphate to be available for plant uptake for a prolonged period of time. At the same time, the interpolymer may inhibit precipitation of inorganic compounds, for example, inorganic phosphate, carbonate, or sulfate salts and/or disperses inorganic particulates such as calcium, magnesium, iron, copper, zinc, manganese, and salts thereof, for example. In an embodiment, the phosphate may be available to the plant for 2-6 months, or throughout the entire growth season of the plant.

The interpolymer mixed with the organic acid may also be applied directly to the soil, particularly in locations where the soil has elevated phosphate levels. As noted above, P may bind to calcium, magnesium, aluminum, and/or iron, forming phosphate minerals. As the amount of phosphate minerals in the soil increases, the amount of phosphorus available in the soil decreases, making the soil inhospitable to plants. When applied to soil, the organic acid may help to breakdown the existing phosphate minerals in the soil, while the interpolymer inhibits further precipitation of inorganic compounds and disperses inorganic particulates. As mentioned above, the interpolymer may help overcome the limitations of P—Zn interactions.

Methods of the Invention

The invention provides a method of enhancing the efficacy of nutrients in a fertilizer, comprising mixing together with the fertilizer an effective amount of a compound of the invention.

The invention also provides a method of stabilizing a fertilizer solution, comprising adding to the fertilizer solution an effective amount of a compound of the invention, wherein the compound is configured to inhibit the precipitation of inorganic phosphate, carbonate or sulfate salts in an aqueous solution.

The invention further provides a method of stabilizing a fertilizer solution comprising adding to the fertilizer solution an effective amount of a compound of the invention, wherein the compound is configured to disperse inorganic particulates including but not limited to calcium, magnesium, iron, copper, zinc, manganese, and salts thereof.

The invention also provides a method of stabilizing a fertilizer solution comprising adding to the fertilizer solution an effective amount of an interpolymer compound of the invention, wherein the compound is configured to inhibit the precipitation of inorganic phosphate, carbonate, or sulfate salts in an aqueous solution and is further configured to disperse inorganic particulates including but not limited to calcium, magnesium, iron, copper, zinc, manganese, and salts thereof. The interpolymer compound may be added to the fertilizer in amounts ranging from about 0.0001% by volume to 10% by volume. In embodiments, the interpolymer is added in amounts ranging from about 0.001% to about 5% by volume, or about 0.001% to about 1.0% by volume. In further embodiments, the interpolymer may be added in an amount equal to about 0.5% by volume.

The following examples further illustrate aspects of the invention. However, they are in no way a limitation of the teachings or disclosure of the invention as set forth herein.

EXAMPLES

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

The invention is now described with reference to the following examples. These examples are provided for the purpose of illustration only, and the invention is not limited to the examples presented herein.

Unless otherwise noted, all starting materials and resins were obtained from commercial suppliers and used without purification.

Example 1: Impact of Interpolymer on Grain Yield in Soils with Variable Phosphorous Concentrations Study Design A study was conducted to test the interpolymer against commercially-known Avail® phosphorous fertilizer enhancer, and their respective impact on corn yield at two sites with soils having different phosphorous (P) concentrations. The test at the site with lower P soil concentration [Test Site 1] was conducted on a Hyde silt loam. The experimental design was a randomized complete block with four replications. DeKalb '67-72' was seeded into soybean stubble at Test Site 1 using conventional tillage. At Test Site 2, planting was done into corn residue using no-till practices. At both sites 34 000 seeds acre$^{-1}$ were planted in four 30 inch rows that were 40 ft long by 10 ft wide. Four treatments were applied:
1. Check—no starter and no P additive
2. Starter—10-27-0+Zn @ 20 gal acre$^{-1}$ applied in a 2×2 band beside the row
3. Starter+Avail—10-27-0+Zn @ 6 gal acre$^{-1}$+Avail @ 0.5% solution applied in-furrow
4. Starter+Interpolymer—10-27-0+Zn @ 6 gal acre$^{-1}$+ Interpolymer @ 0.5% solution applied in-furrow The starter fertilizer was 10-27-0 (10% Nitrogen, 27% Phosphate, 0% potassium) with 2% Zn. Both the interpolymer as described herein and Avail® were added to the starter at 0.5 gal per 100 gal of starter (0.5% by volume). In addition to the fertilizer treatments at planting, nitrogen (N) fertilizer was applied at layby at a rate of 60 gal acre$^{-1}$ of 30% UAN (urea and ammonium nitrate in water). Metolachlor plus atrazine (2 qt acre$^{-1}$) was applied at planting and Steadfast Q (1.5 oz acre$^{-1}$) with atrazine (1 qt acre$^{-1}$) and Clarity (1 pt acre$^{-1}$) was applied at layby using drop nozzles to control weeds. Excellent season-long weed control was noted as a result of these herbicide applications.

Measurements

Plots were harvested using a Kincaid 8XP plot Combine with a HarvestMaster grain gauge that recorded grain weight, moisture, and test weight. Stalk samples were collected from each plot immediately following harvest by taking 6 inches of stalk tissue starting 6 inches above the soil surface. These samples were subsequently analyzed.

Statistical Analysis

To determine differences, statistical analysis was performed on grain moisture, test weight, yield, and stalk $NO_3$—N concentration using a randomized complete block design with treatment as the main plot. When significant differences were determined at a probability level of 0.05 then comparisons were made among the individual treatments using Fischer's protected least significant difference.

Results

Impact of Starter Treatments on Grain Yield

Over 4 inches of rainfall fell at both sites with 3 days of planting. This resulted in water saturated soils and some delay in emergence. Stinkbug infestations at both sites impacted ear development and grain yield. Regardless, at both locations there was a highly significant effect of treatment on grain yield. All of the starter treatments had statistically greater yield than the untreated check (Table 1). At Test Site 1 the greatest yield was obtained by mixing the interpolymer of the invention as described herein with the starter and applying it in-furrow at 6 gal $acre^{-1}$ (169.2 bu $acre^-$). At the site where animal waste had been used extensively resulting in a high concentration of available P the treatment with the greatest yield was the starter fertilizer alone applied in a 2×2 band at 20 gal $acre^{-1}$.

TABLE 1

Grain Yield for three treatments with and without an additive and an untreated check.

|  | Test Site 1 Yield | Test Site 2 Yield |
| --- | --- | --- |
|  | ------- Bu $acre^{-1}$ -------- | |
| 4) 10-27-0-IF @ 6 gal $acre^{-1}$ + Interpolymer @ 0.5% | 169.2 A | 132.5 A |
| 3) 10-27-0-IF @ 6 gal $acre^{-1}$ + Avail @ 0.5% | 155.3 AB | 128.4 AB |
| 2) 10-27-0-2 × 2 @ 20 gal $acre^{-1}$ | 156.7 AB | 133.1 A |
| 1) Check-no starter | 136.1 B | 121.0 B |
| LSD p < 0.05 | 23.7 | 10.27 |

Impact of Treatments on Stalk Nitrate Concentrations

At both locations there were significant differences among the treatments for stalk nitrate content (Table 2). At Test Site 1, Treatment 4 (starter+interpolymer) had a significantly lower stalk $NO_3$—N concentration compared to the other starter treatments or the untreated check. At Test Site 2, all of the starter treatments had significantly lower stalk $NO_3$—N concentration than the untreated check. At both sites the starter+interpolymer treatment resulted in the lowest stalk $NO_3$—N concentration.

TABLE 2

Stalk nitrate concentration for three starter treatments with and without an additive and an untreated check.

|  | Test Site 1 Stalk $NO_3$—N | Test Site 2 Stalk $NO_3$—N |
| --- | --- | --- |
|  | ------- ppm -------- | |
| 4) 10-27-0-IF @ 6 gal $acre^{-1}$ + interpolymer @ 0.5% | 642.5 B | 431.8 B |
| 3) 10-27-0-IF @ 6 gal $acre^{-1}$ + Avail @ 0.5% | 1102.8 AB | 708.3 B |
| 2) 10-27-0-2 × 2 @ 20 gal $acre^{-1}$ | 965.8 AB | 698.3 B |
| 1) Check-no starter | 1707.5 A | 1104.0 A |
| LSD p < 0.05 | 696.2 | 256.6 |

Example 2: Impact of Interpolymer on Canola Yield

A study was conducted to determine the effect of an interpolymer according to the invention on Canola yield. The interpolymer was coated on a dry phosphate fertilizer (MAP) and applied to cool spring soils in northern North America.

The Canola variety studied was DK 74-54 planted at row widths of approximately 25 centimeters. The plot, which covered approximately 384 square feet was previously seeded in barley. The experimental design was a randomized complete block with six replications. A pivot water management system was utilized.

Figure 1:
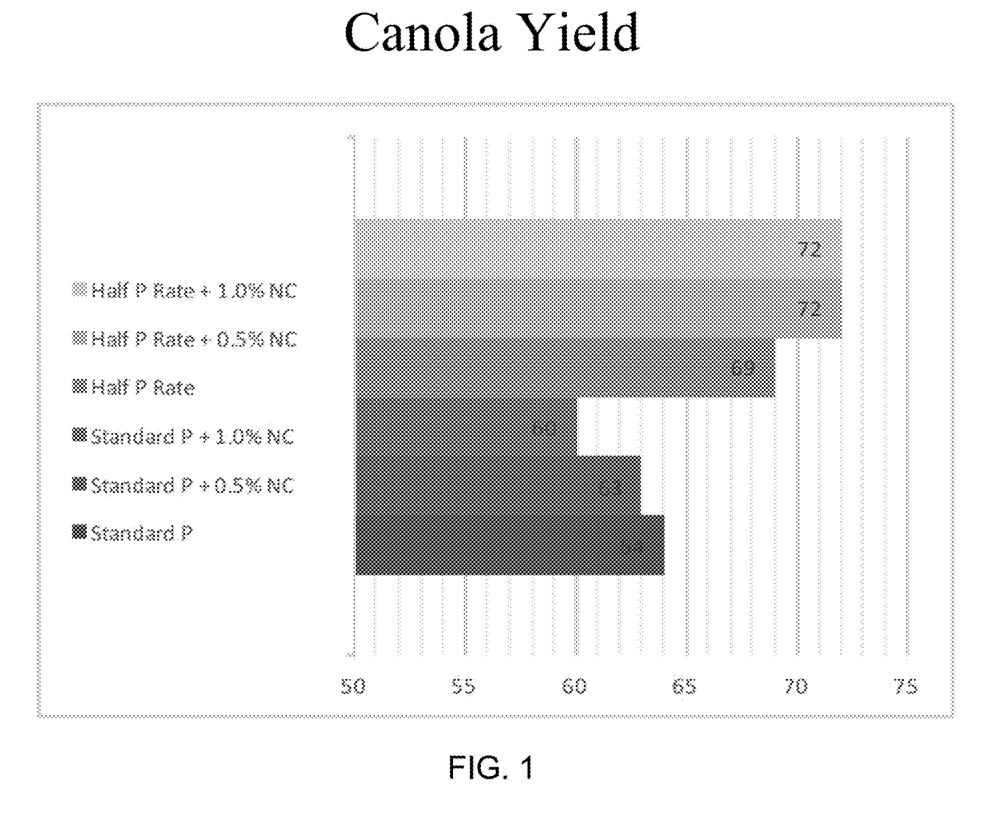
FIG. 1 is a graph illustrating the results of a study conducted to determine the effect of an interpolymer according to the invention on canola yield.

The control fertilizer was 100-50-40-10 applied as a starter. The same starter was used for the trial according to the replications below:
1. Half P rate+1.0% interpolymer
2. Half P rate+0.5% interpolymer
3. Half P rate
4. Standard P+1.0% interpolymer
5. Standard P+0.5% interpolymer
6. Standard P The tests with half P rate+interpolymer showed increased yield. The percentage of interpolymer appeared to have little effect on the results. The results are shown in FIG. 1.

Example 3: Impact of Interpolymer on Corn Yield

A study was conducted to determine the effect of an interpolymer according to the invention on corn yield. The interpolymer was added to the starter fertilizer at 0.5%. The results were compared against the starter fertilizer, and the starter fertilizer plus 0.5% Avail®.

The experimental design was a randomized complete block with four replications. DKC31-10RIB was seeded into soybean stubble using conventional tillage. 32,000 seeds acre$^{-1}$ were planted in 30 inch rows. Three treatments were applied:
1. Check: Starter—6-24-6+@ 4 gal acre$^{-1}$
2. Starter+Avail—6-24-6 @ 4 gal acre$^{-1}$+Avail@ 0.5% solution
3. Starter+Interpolymer—6-24-6 @ 4 gal acre$^{-1}$+Interpolymer @ 0.5% solution The starter fertilizer was 6-24-6 (6% Nitrogen, 24% Phosphate, 6% potassium). Both the interpolymer as described herein and Avail® were added to the starter at 0.5 gal per 100 gal of starter (0.5%).

Figure 2:
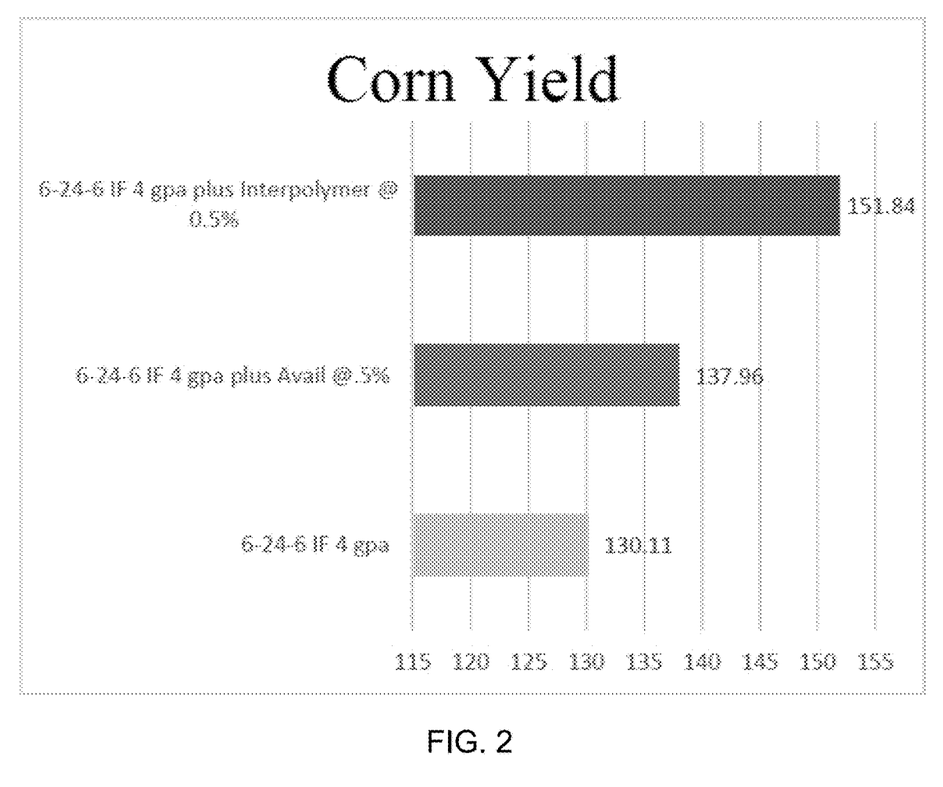
FIG. 2 is a graph illustrating the results of a study conducted to determine the effect of an interpolymer according to the invention on corn yield.
Figure 3:
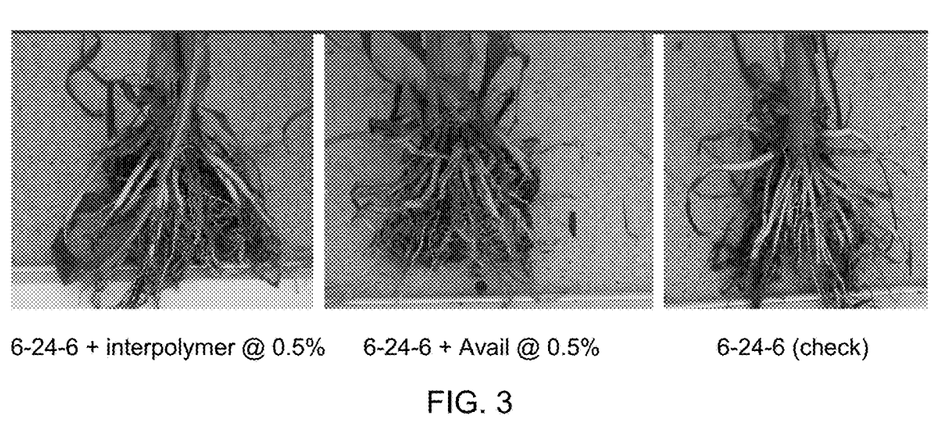
FIG. 3 is a series of photographs illustrating root growth of corn plants treated with the interpolymer fertilizer in accordance with embodiments of the invention.

The results are summarized in FIG. 2. Here, corn yield increased with both Avail and the interpolymer used in combination with the starter fertilizer; however, the interpolymer had the most significant increase in yield. The use of the interpolymer increased yield over the check by 21.7 bushels, and surprisingly, increased yield over the Avail by 13.8 bushels. Additionally, positive root growth was observed in the plants treated with the combination starter and interpolymer fertilizer, as shown in FIG. 3.

Example 4: Impact of Interpolymer on Soybean Yield

A study was conducted to determine the effect of an interpolymer according to the invention on soybean yield. The interpolymer was added to the starter fertilizer at 0.5%. The results were compared against the starter fertilizer, and the starter fertilizer plus 0.5% Avail®.

The experimental design was a randomized complete block with four replications. ASGROW AS0536 was seeded into corn stubble using conventional tillage. 160,000 seeds acre$^{-1}$ were planted in 30 inch rows. Three treatments were applied:
4. Check: Starter—6-24-6+@ 4 gal acre$^{-1}$
5. Starter+Avail—6-24-6 @ 4 gal acre$^{-1}$+Avail @ 0.5% solution
6. Starter+Interpolymer—6-24-6 @ 4 gal acre$^{-1}$+Interpolymer @ 0.5% solution The starter fertilizer was 6-24-6 (6% Nitrogen, 24% Phosphate, 6% potassium). Both the interpolymer as described herein and Avail® were added to the starter at 0.5 gal per 100 gal of starter (0.5%).

Figure 4:
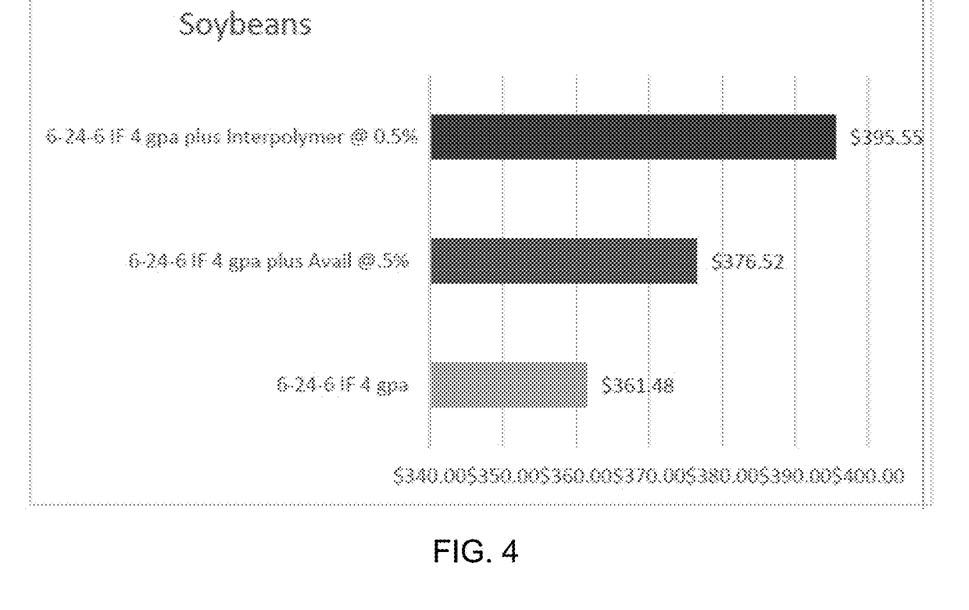
FIG. 4 is a graph summarizing the results of a study conducted to determine the effect of an interpolymer according to the invention on soybean yield.
Figure 5:
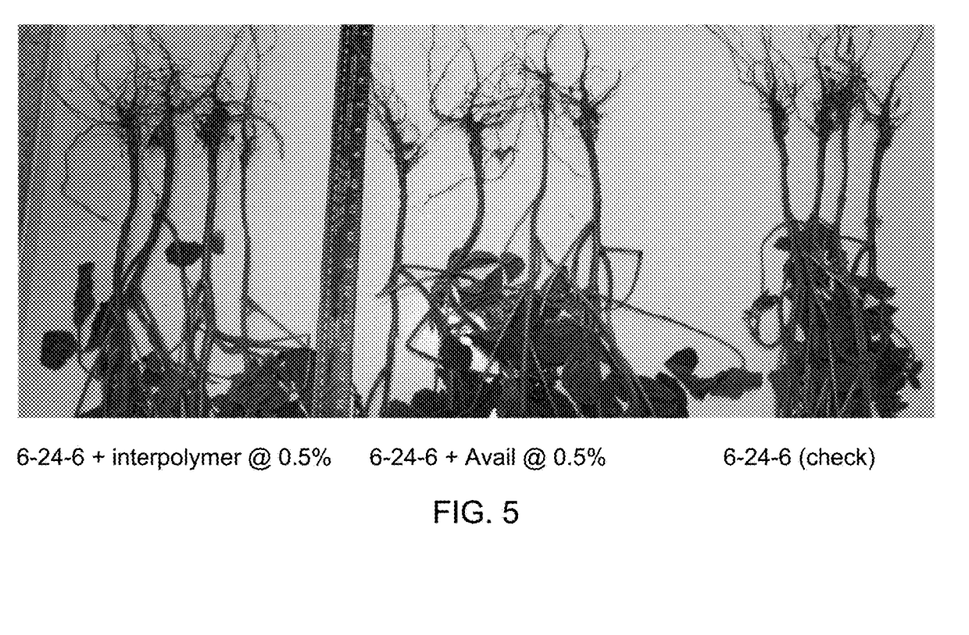
FIG. 5 is a photograph illustrating positive root growth of soybean plants treated with the interpolymer fertilizer in accordance with embodiments of the invention.

The results are summarized in FIG. 4 as a function of dollars acre$^{-1}$ and an assumed cost of $8.80 per bushel. Here, soybean yield increased with both Avail and the interpolymer used in combination with the starter fertilizer; however, the interpolymer had the most significant increase. The use of the interpolymer increased yield over the check by 3.7 bushels per acre. Additionally, the interpolymer fertilizer combination provided a significant economic benefit to the grower with a $19.03/acre advantage over the Avail fertilizer combination, and a $34.07/acre advantage over the check. Further, positive root growth was observed in the plants treated with the combination starter and interpolymer fertilizer, as shown in FIG. 5.

Example 5: Effect of Interpolymer on Dairy Manure Lagoon

Figure 6:
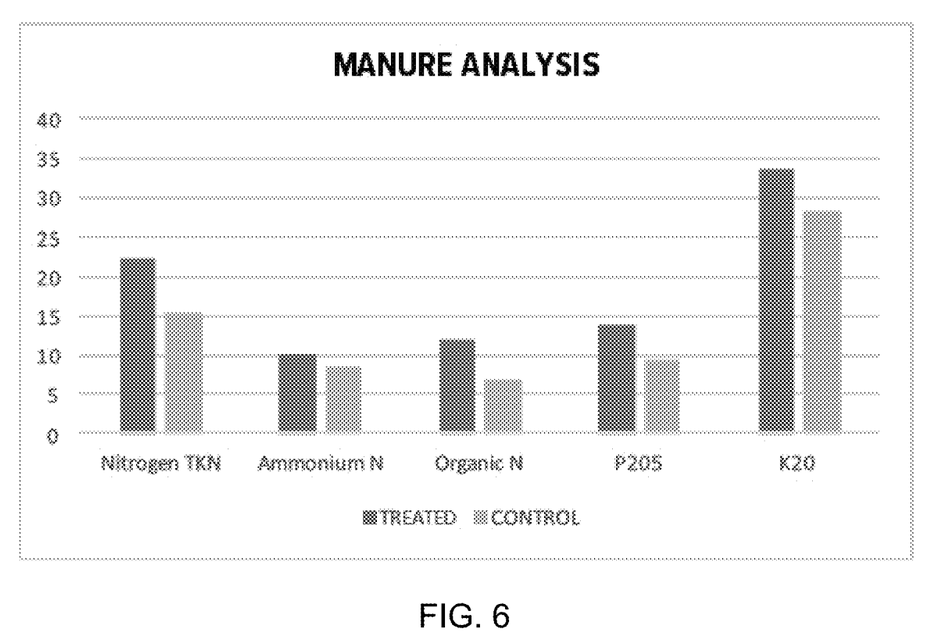
FIGS. 6 and 7 are graphs summarizing the results of two nutrient analysis studies on dairy manure treated with the interpolymer according to various embodiments of the invention.
Figure 7:
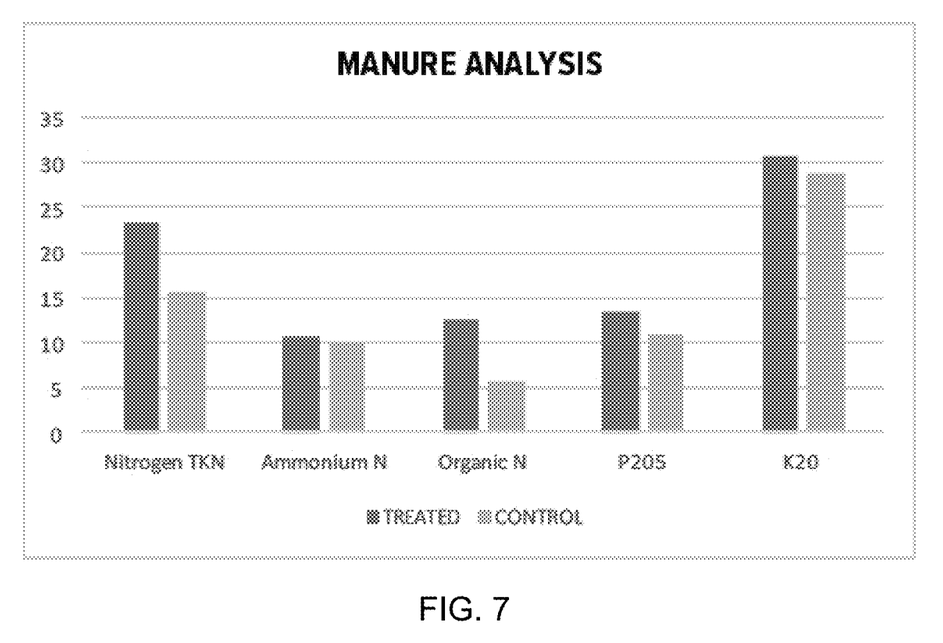

The interpolymer according to the invention was added to a 4 million gallon diary lagoon at a rate of approximately 18 oz. per 14,000 gallons of manure. Nutrient analysis was completed on the treated manure and compared to untreated manure. The results are shown in FIGS. 6 and 7, showing two separately tested samples. FIGS. 6 and 7 illustrate that the manure treated with the interpolymer has more available nutrients. On average, the treated manure has about 32% more nitrogen, about 26% more phosphorous, and about 12% more potassium than the untreated manure. The value per acre of treated manure is therefore substantially increased over typical organic fertilizer. Therefore, the treated manure is more valuable to consumers.

Example 6: Effect of Interpolymer on Hog Manure Lagoon

Figure 8:
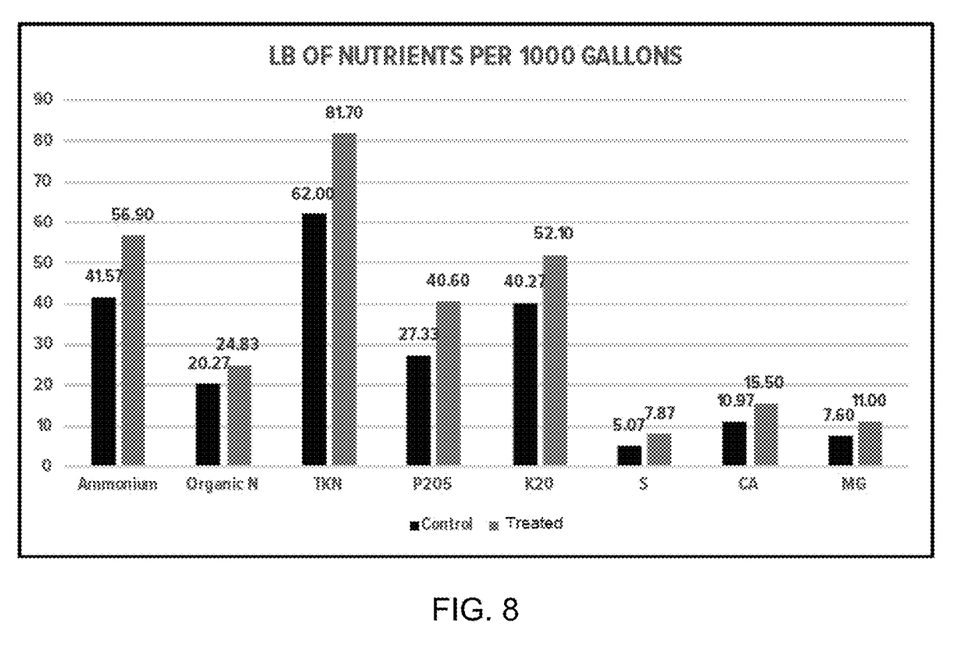
FIG. 8 is a graph summarizing the results of a nutrient analysis study conducted to determine the effect of an interpolymer according to the invention on hog manure.

The interpolymer according to the invention was added to a 400,000 gallon hog lagoon at a rate of approximately 18 oz. per 4,000 gallons of manure. Nutrient analysis was completed on the treated manure and compared to untreated manure. The results are shown in FIG. 8, which illustrates that the manure treated with the interpolymer has more available nutrients. On average, the treated manure has about 31% more nitrogen, nearly 50% more phosphorous, and about 30% more potassium than the untreated manure. The value per acre of treated manure is therefore substantially increased over typical organic fertilizer. Therefore, the treated manure is more valuable to consumers.

In addition to the available nutrients, the interpolymer was also effective to pull solids off of the bottom of the pit, allowing the manure to be more homogenous, as shown in Table 3, below.

TABLE 3

| SAMPLES COLLECTED AT BEGINNING, MIDDLE, AND END OF PUMPING. | | | |
|---|---|---|---|
| | BEGINNING | MIDDLE | END |
| CONTROL | 5.5% | 6% | 8% |
| TREATED | 10.4% | 9.7% | 10.1% |

Ammonia Draeger readings show that the treated manure had significantly reduced odors as compared to the untreated manure. The control manure average approximately 36 parts per million (ppm) ammonia, while the treated manure averaged approximately 6 ppm ammonia.

Example 7: Effect of Interpolymer Mixed with Citric Acid

The interpolymer according to the invention was mixed with citric acid and applied to a test site. In comparison to the control site, which received 6-24-6 fertilizer (6% Nitrogen, 24% Phosphate, 6% potassium) and zinc, the test site saw between a 13-16% increase in yield.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

What is claimed is:

1. A composition for enhancing the availability of nutrients in soil, comprising:
(a) a precipitation inhibiting or dispersing interpolymer comprising Structures A, B, C, and D:

wherein:
Y is H;
Z is COOX;
X is Na or K;
R2, R12, and R14 are each independently H;
R3 is H;
R4 is (—C(CH$_3$)$_2$—CH$_2$—); and
R13 is (—C(CH$_2$)CH$_2$OH) or (—CH$_2$CH(CH$_3$)OH); and
W is N(H)(C(CH$_3$)$_2$—CH$_3$; and
(b) citric acid.

2. The composition of claim 1, wherein about 10 to 90 weight perfect of the polymer units of the interpolymer are derived from Structure A.

3. The composition of claim 2, wherein about 10 to 50 weight percent of the polymer units of the interpolymer are derived from structures B, C, and D.

4. The composition of claim 1, wherein about 10 to 50 weight percent of the polymer units of the interpolymer are derived from structures B, C, and D.

5. The A method of applying the composition of claim 1, wherein comprising applying the composition is configured for application to soil either alone or together with a fertilizer.

6. A composition for enhancing the availability of nutrients in soil, comprising:
a precipitation inhibiting or dispersing interpolymer comprising Structures A, B, C, and D:

wherein:
Y is H;
Z is COOX;
X is Na or K;
R2, R12, and R14 are each independently H;
R3 is H;
R4 is (—C(CH$_3$)$_2$—CH$_2$—); and
R13 is (—C(CH$_2$)CH$_2$OH) or (—CH$_2$CH(CH$_3$)OH); and
W is N(H)(C(CH$_3$)$_2$—CH$_3$.

7. The composition of claim 6, wherein about 10 to 90 weight perfect of the polymer units of the interpolymer are derived from Structure A.

8. The composition of claim 7, wherein about 10 to 50 weight percent of the polymer units of the interpolymer are derived from structures B, C, and D.

9. The composition of claim 6, wherein about 10 to 50 weight percent of the polymer units of the interpolymer are derived from structures B, C, and D.

10. A method of applying the composition of claim 6, comprising applying the composition to manure.

11. The method of claim 10, wherein the interpolymer is effective to decrease odor emanating from the manure.

12. A composition for enhancing the availability of nutrients in soil, comprising:

(a) a precipitation inhibiting or dispersing interpolymer comprising Structures A, B, C, and D:

(A)

(B)

(C)

(D)

wherein:
Y is H;
Z is COOX;
X is Na or K;
R2, R12, and R14 are each independently H;
R3 is H;
R4 is (—C(CH$_3$)$_2$—CH$_2$—); and
R13 is (—C(CH$_2$)CH$_2$OH) or (—CH$_2$CH(CH$_3$)OH); and
W is N(H)(C(CH$_3$)$_2$—CH$_3$; and (b) an organic acid.

13. The composition of claim 12, wherein the organic acid is selected from the list consisting of citric acid, humic acid, lactic acid, acetic acid, formic acid, oxalic acid, malic acid, uric acid, tartaric acid, ascorbic acid, and combinations thereof.

14. The composition of claim 13, wherein the organic acid is citric acid.

15. The composition of claim 12, wherein the weight ratio between the interpolymer and the citric acid is in the range of about 1:1 to 20:1.

16. The composition of claim 15, wherein the weight ratio between the interpolymer and the citric acid is about 10:1.

17. A method of applying the composition of claim 12, comprising applying the composition to soil either alone or together with a fertilizer.

* * * * *